July 8, 1952 R. H. ORTER 2,602,406
SUN SHIELD ROOF FOR HOUSE TRAILERS
Filed April 15, 1948
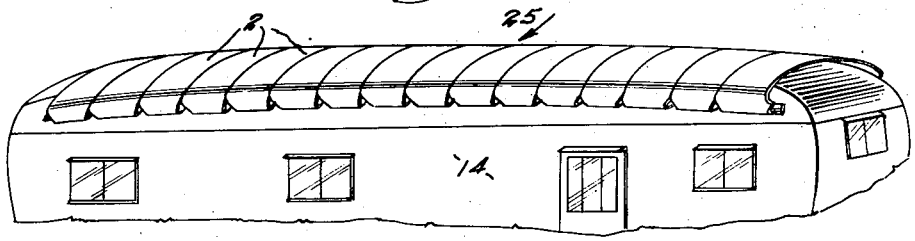
INVENTOR
Ralph H. Orter
BY Scott L. Norviel ATTORNEY Patented July 8, 1952

2,602,406

UNITED STATES PATENT OFFICE 2,602,406

SUN SHIELD ROOF FOR HOUSE TRAILERS

Ralph H. Orter, Phoenix, Ariz.

Application April 15, 1948, Serial No. 21,102

3 Claims. (Cl. 108—3)

This invention pertains to sun shield roofs for trailers or the like.

One of the objects is to provide a second or "over roof" having sections which can easily be attached to and detached from automobile house trailers to provide a shade for the roof and top portions with adequate ventilation space thereover.

A second object is to provide a sun shield roof for house trailers composed of a plurality of metal sections which can easily be secured in place over the top of the trailer body, and when so positioned, will provide a composite metal cover, with an adequate ventilating space over the trailer top which is weather-proof, resistant to wind, and has a pleasing appearance;

A third object is to provide units, which form a composite over roof for a house trailer, which can easily be applied to grooved rails positioned along the sides of the trailer body and be retained thereby under tension so as to attain an upwardly arched curvature, resistant to vibration and strains due to wind and weather;

A fourth object is to provide a means for attaching sections of an over roof of various designs to the sides of the tops of house trailers so that the sections remain firm and secure but may be easily removed one at a time with a minimum of physical effort; and A fifth object is to provide a sectional sun cover for house trailers which can be easily and cheaply manufactured and efficiently applied.

Other objects will appear hereinafter.

I attain the foregoing objects by means of the devices, structures, and mechanism shown in the accompanying drawings, in which—

Figure 1 is a perspective view of a house trailer with its top covered with one form of my sectional sun shade over roofs;

Figure 2, an end view of one of the over roof sections in place on a house trailer top, drawn on an enlarged scale;

Figure 3, a perspective view of one of the said roof sections, showing its relation to adjacent sections;

Figure 4, an enlarged perspective view of a fragment of the trailer side wall, an attaching rail, and the attaching portion of a roof section;

Figure 5, a perspective of a portion of a modified form of a trailer sun shade over roof;

Figure 6 is an end view of a further modified form of unit structure of a sun shade over roof;

Figure 7, an end view of a portion of a trailer top, with one of my over roof sections attached and showing a duplex form of attaching rail; and Figure 8, a vertical section through a portion of over roof structure showing the use of forming bars between roof sections.

Similar numerals refer to similar parts in the several views.

In the preferred form, shown particularly in Figures 1, 2, and 3, strips of aluminum, forming roof sections 2, are made with end portions 3 curved and curled under so as to dispose the ends 4 beneath the end portions of the top 5.

The edges at each end of the strip are bent and rolled to form beads 6 (see Figure 4). These are sized to engage in grooves 8 of awning rails 10 with an easy sliding fit.

Awning rails 10 and 10a are secured by screws 11, or otherwise as desired, to each side of the trailer body 14 adjacent the edges of its top 15.

Normally, the top 5 of each section 2 is straight, but the length of the strip is proportioned so that, when each bead 6 is applied to its respective supporting groove in the awning rails, the top 5 will be arcuately bowed upward, as shown in Figures 2 and 3. A tension is thus provided so that the beads 6 tend to flair outward, but are retained in position by the lips 18 of grooves 8. Thus, each section is resiliently retained in position and the arched center portion and curved end portions stand away from the top and upper sides of the trailer house body affording ventilating spaces 20 and 21, respectively.

These sections are slipped into the grooves 8 of the rails from each end and positioned with their side edges 22 closely adjacent, or slightly overlapping, as desired. To attain the latter relation, the side edges 24 of the end curved portions 3 are narrowed somewhat, as shown in Figure 3. When a number of sections 2 are installed, a composite sun shade over roof 25 is formed as shown in Figure 1.

Where it is not desired to abut the edges of strips 2, nor to merely overlap them, former bars 45, having grooves on each side to receive adjacent edges 22 of these strips, may be provided, as shown in Figure 8. These bars are curved lengthwise to conform to the desired transverse curvature of the top and extend thruout the upper portion 5 of strips 2. These bars serve to form a weather-proof seal between the strips, and afford a means for confining the mid-portions of the strips to a definite curvature.

Where, due to varying weather conditions, or otherwise, different materials are preferred, I provide a similar structure composed of units made of strips of thin flexible wood 28, as shown in Figure 6. In order to attach these to the trailer rails 10 and 10a, I provide triangular-shaped brackets 29 at each end secured to the under side of end portions of the strips 28. As in the form previously described, these are bowed upward as they are attached and the beads 30 at the inner apex of the triangular brackets slipped into the grooves of the rails.

Where more ventilating space is required, and available materials again vary, I provide the further modification shown in Figure 5. Here the sides 33 of each unit 32 are straight and meet at a gable 34. The ends are sharply folded under at 35 and braced by struts 36. Beads 38 are formed as in all other types and fit into rails 10 and 10a. Transverse struts 39 may be used to maintain the shape of the sides 33. Flexibility, to aid in maintaining installation, is afforded by the spring of the material below transverse stiffening struts 39.

The use and installation of the modified forms is the same, and the material and outward composite appearance of the completed sunshade is, obviously, a matter of choice.

Where it is desired to use awnings in addition to the sunshade top, here described, I provide a double grooved rail 40, shown in Figure 7. With this type rail, the top section 2 is secured in groove 6a, while the additional groove 6b affords adequate means for the attachment of awning 42, as indicated by dotted lines.

From the foregoing it will be understood that I have provided a light resilient over top or sun shade which may be easily applied to all types of house trailers by the simple expedient of attaching rails having grooves with overlapping lips to the sides of the trailer body near the top. The sections are, in all cases, light, easily applied or removed, and, when installed, are under a slight but sufficient tension to prevent dislodgement, loosening, or vibration.

I realize that further modification can be made to the above forms, and that variations can also be made in the exact form of attachment shown. Therefore, it is intended that the following claims should be liberally construed and interpreted.

I claim:

1. In a sun shade over-roof for house trailers, having rails with over-laying lips defining longitudinal grooves, attached along the upper body part thereof, the combination therewith of sun shade units composed of a plurality of upwardly arched adjacent sections, having under turned laterally positioned ends terminating in beaded edges adapted to slidable engagement with said rail grooves and including vertical struts securing said underturned end portions, horizontal bracing securing the sides of said gable section, and a cap piece secured to the top of each of said sections.

2. In house trailer having lateral rails attached along the upper portion of each side, each rail having a groove with overhanging retaining lips, the combination therewith of a ventilating over-roof composed of a plurality of relatively narrow transversely extending sections, each having an upwardly arched central portion, downwardly and inwardly curved end portions terminating in inwardly directed end edges having rolled beads therealong each end being removably inserted longitudinally into each of said lateral rails and retained therein.

3. In house trailer having lateral rails attached along the upper portion of each side, each rail having a groove with overhanging retaining lips, the combination therewith of a ventilating over-roof composed of a plurality of relatively narrow transversely extending sections, each having an upwardly arched central portion, downwardly and inwardly curved end portions terminating in inwardly directed end edges having rolled beads therealong each end being removably inserted longitudinally into each of said lateral rails and retained therein, said sections being transversely proportioned so that when said beaded ends are retained within said lateral rails, the curved end portions are drawn together sufficiently so that said central portion is arched upwardly and maintained above the roof of said house trailer.

RALPH H. ORTER.

REFERENCES CITED

The following references are of record in the file of this patent:

UNITED STATES PATENTS

| Number | Name | Date |
| --- | --- | --- |
| 1,204,882 | Kiddler | Nov. 14, 1916 |
| 1,236,149 | Coventry | Aug. 7, 1917 |
| 1,567,228 | Becker | Dec. 29, 1925 |